United States Patent [19]
Wallace

[11] Patent Number: 4,949,664
[45] Date of Patent: Aug. 21, 1990

[54] WARNING TAPE FOR UNDERGROUND LINES

[75] Inventor: Steven J. Wallace, Waterloo, Wis.

[73] Assignee: Thor Enterprises, Inc., Sun Prairie, Wis.

[21] Appl. No.: 292,774

[22] Filed: Jan. 3, 1989

[51] Int. Cl.$^5$ ............................................. G01D 21/00
[52] U.S. Cl. .............................. 116/209; 116/DIG. 14; 174/37; 174/38; 174/39; 428/246; 428/252
[58] Field of Search ................. 116/209, DIG. 14; 174/37, 38, 39; 405/154, 157; 428/252, 246, 247, 344, 457, 265, 269, 272

[56] References Cited

U.S. PATENT DOCUMENTS

| | | | |
|---|---|---|---|
| 2,278,673 | 4/1942 | Savada et al. | 116/DIG. 14 |
| 2,714,571 | 8/1955 | Irion et al. | 116/DIG. 14 |
| 2,772,993 | 12/1956 | Magnuson | 116/DIG. 14 |
| 3,214,320 | 10/1965 | Lappala et al. | 116/DIG. 14 |
| 3,504,503 | 4/1970 | Allen | 405/157 |
| 3,568,626 | 3/1971 | Southworth | 116/DIG. 14 |
| 3,908,582 | 9/1975 | Evett | 116/DIG. 14 |
| 4,623,282 | 11/1986 | Allen | 116/DIG. 14 |
| 4,654,639 | 3/1987 | De Courville | 116/DIG. 14 |
| 4,767,237 | 8/1988 | Cosman et al. | 405/157 |
| 4,781,958 | 11/1988 | Gilbert | 405/157 |

FOREIGN PATENT DOCUMENTS 1420269  1/1976  United Kingdom ............... 405/157

*Primary Examiner*—Allan N. Shoap
*Assistant Examiner*—Hohenshell, Jeffrey J.
*Attorney, Agent, or Firm*—Burmeister, York Palmatier & Zummer

[57] ABSTRACT

An elongated tape for marking underground lines having a cross-woven scrim formed by a first plurality of elongated plastic fibers disposed parallel to the axis of elongation of the tape and a second plurality of elongated fibers disposed normal to the fibers of the first plurality. Preferably, the tensile strength of the second plurality of fibers exceeding the tensile strength of the first plurality of fibers. The scrim is coated with a layer of plastic to form a surface, and a sign is disposed on the surface. If the tape while buried encounters a digger, it tends to break transversely rather than along the axis of elongation leaving the sign legible. In one embodiment, a layer of electrically conducting foil is disposed on one side of the scrim.

18 Claims, 1 Drawing Sheet

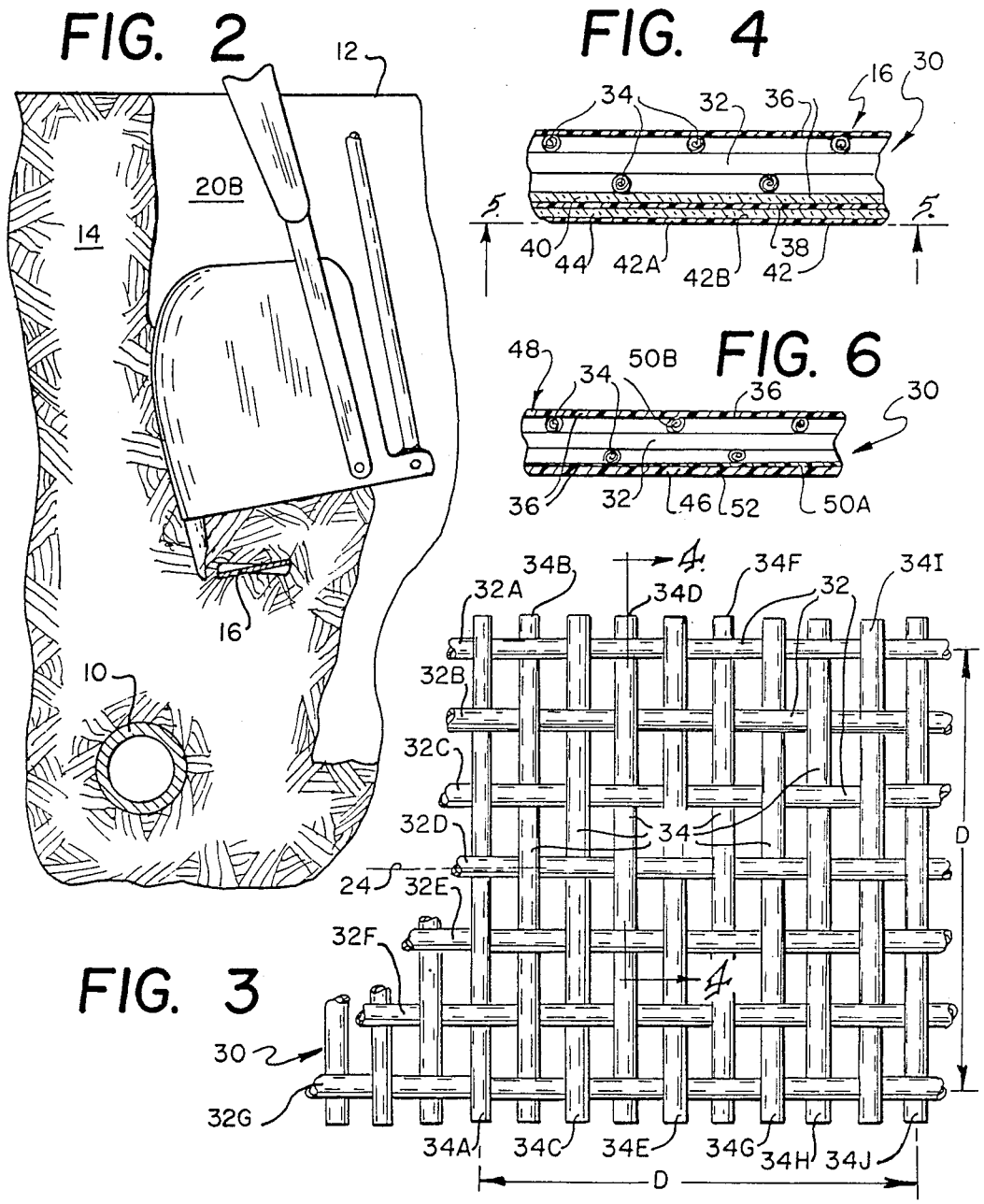

WARNING TAPE FOR UNDERGROUND LINES

This invention relates to markers for conveying information and warnings, and particularly to markers in the form of elongated tape buried above underground utility lines.

BACKGROUND OF THE INVENTION

Utility companies conventionally bury their utility lines beneath the surface of the earth in order to provide additional protection for the lines and to prevent the lines from becoming an undesirable addition to the landscape. This is true both for urban utility lines, such as water, sewer, gas, and electrical, and for cross country lines for transporting oil, chemicals, natural gas, and electricity, as well as other products. Even though the lines are more protected beneath the surface of the ground, they are still subject to being severed either by natural causes or by careless excavation. Further, buried utility lines must be located and exposed occasionally for inspection and repair.

It has become customary to lay a wire or tape above a utility line to facilitate location of the line and to give an early warning that the line is near. If the wire or tape is electrically conducting, a metal detector may be utilized to indicate the general vicinity of the line, so that excavation can proceed with the necessary caution to avoid accidental damage or severance of the line. U.S. Pat. No. 3,282,057, of A. W. Prosser entitled UNDERGROUND LINE AND METHOD OF INSTALLING SAME describes the installation and use of such tape.

The warning tape presently used in the utility industry in association with buried lines is of one of two types. The tape is either a narrow thin plastic strip with a sign or legend printed on at least one surface of the tape in a repetitive pattern, or it is a narrow, thin assembly of three layers with a sign on at least one of the sides of the assembly, such as shown in U.S. Pat. No. 4,623,282 of Gordon H. Allen. In the latter construction, the central layer is an electrically conducting foil which is secured by adhesive, heat or coating to the two outer layers which are thin plastic sheets.

Since buried lines are generally a distance of the order of feet below the surface of the earth, it is conventional practice to use earth excavating equipment to lay such lines or to expose such lines for inspection or repair. When excavating equipment approaches a buried line which is protected by a warning tape, either intentionally or accidentally, it is the intention of the line constructor that the excavator encounter the warning tape before he encounters the line, and accordingly, a legend is printed on the warning tape to advise the excavator of the precise risk undertaken by continued excavation. The tape thus carries a sign which may even be a legal notice to the excavator of liability for damage to the adjacent utility line.

The sign on the tape is of little value if it cannot be read. Unfortunately, many tapes distort on excavation or assume a contour effectively masking the information of the sign on the tape. Warning tapes are almost universally in the form of thin plastic strips. Such strips tend to roll or twist into a rope configuration if placed under tension, and in this configuration the sign is partly obscured and illegible. Further, excavation is generally performed with a bucket type digger such as a trench digger, drag line or Bobcat. The inventor has found that a bucket type digger affects the legibility of the sign on the tape differently depending upon the direction of approach to the buried marking tape. If the digger approaches the tape perpendicularly from the side, the walls of the trench dug by the digger are not appreciably distorted and the tape is held sufficiently securely by the earth in these walls to cause the bucket of the digger to shear the warning tape, thus leaving a short section of warning tape in the bucket or in the earth discharged from the bucket. Sections of warning tape sheared in this manner may be hard to locate for the operator, but they have not been subject to tension along the axis of the tape and will not be unduly distorted but tend to be legible.

If the bucket type digger approaches the tape along a path on or near the axis of the tape in a parallel direction to the installation, the earth surrounding the tape becomes loosened by the digger and the digger tends to grab the tape and place a section of the tape under axial tension, often with disastrous results as far as the preservation of legibility of the sign on the tape is concerned. The axial tension tends to stretch the tape, distorting the sign, and in the end tearing the tape erratically.

It is not feasible to bury a tape which is sufficiently strong to resist the deleterious affects of the digging operation described above. If the bucket approaches the tape normal to its elongation axis, the sharp walls of the bucket working against the surfaces of the trench being dug by the digger cut the tape, and it would require a very thick tape, if made of plastic, or a very strong tape to resist the cutting action of the bucket. Further, the tape tends to be legible when cut from this direction. To provide a tape which will not stretch or tear when the digger excavates generally parallel to the longitudinal axis of the tape increases the cost of the tape unjustifiably.

BRIEF DESCRIPTION OF THE INVENTION

It is a general object of the invention to provide a warning tape for underground use which is provided with a sign which remains legible when the tape is excavated from beneath the surface of the earth, regardless of the direction of approach of the excavation equipment.

It is also an object of the invention to provide a warning tape for underground use in the form of a thin plastic strip which carries a sign on at least one side thereof which has a greater tendency to remain flat than presently known tapes of this type.

In addition it is an object of the present invention to provide a warning tape for underground use which has the foregoing characteristics and which will withstand the hostile environment experience by being buried without deterioration of the sign carried by the tape as well as deterioration of the tape itself.

It is also an object of the present invention to provide a warning tape for underground use which achieves the foregoing objects at a cost which is competitive with the thin plastic tapes presently in use in the utility industry.

The inventor has achieved the foregoing objects of the invention by providing a tape in the form of a plastic strip which is weaker when placed under tension along its longitudinal axis than when placed under tension along its transverse axes. More specifically, the inventor has achieved the objects of this invention by providing a warning tape in the form of a cross woven plastic scrim or fabric in which the warp count is less than the weft count. The greater weft count provides the tape with greater resistance against longitudinal tearing of the tape and the lower warp count assures a transverse separation in the event the longitudinal tension exceeds the breaking point.

The woven fabric is provided with a plastic coating to reduce the surface exposed to the adverse effect of the environment and to facilitate use of the fabric with a metal foil to make the tape detectable by a metal detector. In a preferred construction, a metal foil is secured on the coated fabric, and a thin layer of plastic is secured onto the foil opposite the fabric. The sandwich of fabric-foil-layer is secured together by layers of adhesive, heat, and/or coating disposed between the coated fabric and foil and between the foil and plastic layer to provide a water tight bond between the foil and the coated fabric and between the foil and the plastic layer.

In a preferred construction, the sign is reverse printed on a clear transparent plastic layer before the layer is secured to the foil with the surface upon which the sign is printed adjacent to the foil, whereby the plastic layer will protect the sign from moisture and abrasion. In the alternative, the sign may be printed on the surface of the plastic layer opposite the foil and the materials of the printing selected to withstand the moisture and adverse soil conditions when buried. In the latter case, the exterior surface of the plastic layer is preferably provided with a thin additional coating for protection.

DESCRIPTION OF THE DRAWINGS

The present invention will be more fully understood from the following description and the appended drawings, in which:

FIG. 1 is a plan view of a utility line provided with a warning tape constructed according to the present invention, excavation of the tape having begun;

FIG. 2 is a sectional view taken along the line 2—2 of FIG. 1;

FIG. 3 is a fragmentary plan view of the tape illustrated in FIGS. 1 and 2 illustrating the fabric side of the tape, the coating having been removed for clarity;

FIG. 4 is a sectional view of the tape taken along the line 4—4 of FIG. 3;

FIG. 5 is a plan view of the tape illustrating the opposite side from FIG. 3; and FIG. 6 is a sectional view of a warning tape which constitutes another embodiment of the present invention.

DETAILED DESCRIPTION OF THE INVENTION

FIGS. 1 and 2 illustrate a utility line 10 buried beneath the surface 12 of the earth 14. An elongated warning tape 16 constructed according to the present invention is disposed above and adjacent to the utility line 10. The warning tape 16 is preferably six to eighteen inches directly above the utility line 10, but it may also be disposed at one side of the line 10, as illustrated for the purpose of clarity.

FIGS. 1 and 2 also illustrate a trench 18 cut into the earth 14 to a depth less than the depth of the warning tape 16 and perpendicular to the warning tape. The trench 18 has parallel walls 20A and 20B which extend vertically into the earth normal to the axis of elongation 24 of the warning tape 16. As is conventional, the trench 18 is being excavated by a bucket type machine, not shown. The bucket of the machine will engage the tape when it advances sufficiently along an axis 22 normal to the longitudinal axis 24 of the warning tape. The bucket of the excavator in approaching the warning tape extends the walls 20A and 20B, and when the bucket reaches and engages the warning tape 16, it extends the walls to the tape and severs the warning tape at the extended walls. Hence, unless the leading edge of the bucket itself engages the warning tape, the bucket will sever the tape by a shearing action along the walls 20A and 20B and the warning tape will not be placed under tension along its longitudinal axis 24. If the leading edge of the bucket itself engages the warning tape, there will be tension to tear the tape along its longitudinal axis as well as shearing tension at the walls 20A and 20B.

FIG. 1 also illustrates a second trench 26 with vertical trench walls 28A and 28B. Trench 26 is an incomplete excavation of the warning tape 16 along the longitudinal axis 24 of the tape. As the digging machine advances, it removes the earth along the trench above the warning tape 16, so that when the bucket does engage the warning tape, an indeterminately long section of tape is free from the packed earth to move with the bucket. It is this free section that is likely to stretch and twist, and it is this same free section that will be unearthed by the excavator.

To avoid distortion of the warning legend or sign on the warning tape 16, the inventor has provided the tape 16 illustrated in FIGS. 3 through 5 which has the characteristic of tearing more readily along the transverse axes of the tape than along the longitudinal axis 24 of the tape.

The tape 16 contains a scrim or fabric 30 cross-woven with a first plurality 32 of substantially straight plastic yarns which extend parallel to the longitudinal axis 24 of the tape and a second plurality 34 of substantially straight plastic yarns which extend transversely of the first plurality of yarns. FIG. 3 illustrates the manner in which the fabric 30 is woven, and the yarns of the first plurality 32 of yarns are designated 32A, 32B, 32C, 32D, 32E, 32F and 32G in the fragment illustrated. Also, the yarns of the second plurality 34 are designated 34A, 34B, 34C, 34D, 34E, 34F, 34G, 34I and 34J in the fragment of the fabric 30 illustrated. Alternate yarns 34A and 34C of the second plurality 34 are woven over alternate yarns 32A and 32C and under yarns 32B and 32D of the first plurality 32 of yarns. In like manner, yarns 35B and 34D are woven under yarns 32A and 32C and over yarns 32B and 32D. This pattern is continued throughout the fabric. Further, FIG. 3 illustrates that in the unit of length D, there are 7 yarns of the first plurality 32 and 10 yarns of the second plurality 34, hence making the fabric 30 more difficult to tear along the longitudinal axis 24 than a transverse axis normally thereto. The invention may be practiced with the first plurality 32 of yarns from about 25% to about 90% in number per unit of length of the yarns in the second plurality 34 of yarns.

In the preferred embodiment, the yarns 32 and 34 are of equal diameter and tensile strength, but may be unequal with the total denier of the yarns 32 exceeding the total denier of the yarns 34. The yarns are formed in a conventional manner by severing a thin plastic sheet into strips of equal width and rolling the strips tightly to form the yarns 32 and 34. The yarns are thereafter woven in a commercial process into the fabric 30. A thin coating 36 of plastic is applied to both sides of the fabric 30 by a commercial plastic spraying process to make the fabric water impermeable.

A thin foil 38 of electrically conducting material is secured onto one surface of the coating 36 on the fabric 30 by a layer 40 of adhesive. In like manner, a thin plastic film 42 is attached to the surface of the foil 38 opposite the coating 36 by a second layer of adhesive 44 to protect the foil from the deleterious effects of electrical and chemical reaction and moisture which result from the warning tape being buried in the earth.

FIG. 5 illustrates the sign or legend 46 visible from the outer surface 42A of the film 42. The sign 46 may be surface printed on the surface 42A in the conventional manner, but it is preferably reverse printed on the inner surface 42B and the film 42 formed of transparent clear plastic.

FIG. 6 illustrates a nonconducting warning tape 48 embodying the present invention. The warning tape 48 has a fabric 30 provided with a coating 36 which is identical to that of FIGS. 3 through 5, and the same reference numerals are applied to these elements. The coatings 36 form two substantially flat surfaces 50A and 50B, and the sign 46 is disposed on one of these surfaces 50A. Conventional surface printing using water resistant inks is utilized to produce the sign. If desired a protective coating 52 is applied to the surface 50A covering the sign 46.

In a preferred construction, the yarns 32 and 34 are of high density polyethylene and the coating 36 is polyolefin. The nonconducting warning tape of FIG. 6 has a thickness of 0.0071 inch and is printed with a heat-set ink that resists deterioration from water, or the chemical or electrical reactions present in earth. A coating 52 of clear transparent polyethylene is provided.

In a preferred construction of the electrically conducting warning tape of FIGS. 3 through 5, the fabric 30 and coating 36 are as indicated above, and the foil 38 is a 0.00035 inch thick aluminum foil. The film 42 is reverse printed on side 42B with heat-set ink and is a sheet of clear transparent polyethylene of 0.0005 inch thickness. The film 42 may be polyethylene with a thickness from about 0.0005 to about 0.002 inch.

Other plastic materials may be used for the yarns, coating and the film as long as the materials are capable of providing the desired stability and resistance to deterioration when subjected to underground conditions. Likewise other well known metal conducting foils or wire may be employed for the electrically conducting warning tape.

Those skilled in the art will find applications for the present invention beyond those set forth in this description of this invention. It is therefor intended that the scope of this invention be not limited by the foregoing specification, but rather only by the appended claims.

The invention claimed is:

1. An indicating means for use in a backfilled trench above an elongated line comprising an elongated tape having a first plurality of plastic fibers disposed substantially parallel to the axis of elongation of the tape and a second plurality of fibers disposed substantially parallel to each other, the second plurality of fibers being disposed normal to the first plurality of fibers and being cross-woven with the first plurality of fibers into a scrim, the number of fibers per unit length of the first plurality being no greater than 25 to 90 per cent of the number of fibers of the second plurality, a plastic coating disposed on at least one surface of the scrim, said coating closing voids between the fibers and rendering the tape water impervious, and a sign disposed on the tape adapted to contain information relating to the line.

2. An indicating means for use in a backfilled trench above an elongated line comprising the combination of claim 1 in combination with an electrically conducting metal foil mounted on one side of the scrim.

3. An indicating means for use in a backfilled trench above an elongated line comprising the combination of claim 2 in combination with a thin plastic film mounted on the side of the foil opposite the scrim, the assembly of scrim, coating, foil and film forming a water tight elongated structure.

4. An indicating means for use in a backfilled trench above an elongated line comprising the combination of claim 3 wherein the sign is reverse printed on the side of the film adjacent to the foil.

5. An indicating means for use in a backfilled trench above an elongated line comprising the combination of claim 3 wherein the first and second plurality of fibers are of high density polyethylene and the coating on the scrim is polyolefin and the foil is of aluminum.

6. An indicating means for use in a backfilled trench above an elongated line comprising the combination of claim 5 wherein the film is of polyethylene.

7. An indicating means for use in a backfilled trench above an elongated line comprising the combination of claim 3 wherein the sign is printed on the surface of the film opposite the foil.

8. An indicating means for use in a backfilled trench above an elongated line comprising the combination of claim 7 wherein the film and sign are overcoated with a thin layer of clear plastic.

9. An indicating means for use in a backfilled trench above an elongated line comprising the combination of claim 8 wherein wherein the layer is of polyethylene.

10. An indicating means for use in a backfilled trench above an elongated line comprising the combination of claim 1 wherein the number of fibers per unit length of the first plurality is 25 to 70 per cent of the number of fibers of the second plurality in said unit of length.

11. An indicating means for use in a backfilled trench above an elongated line comprising the combination of claim 1 wherein the first and second plurality of fibers are of high density polyethylene and the coating on the scrim is polyolefin.

12. An indicating means for use in a backfilled trench above an elongated line comprising a thin tape having an axis of elongation and a transverse axis normal to the axis of elongation, said tape having a first plurality and a second plurality of elongated plastic fibers, the fibers of the first plurality of fibers being disposed substantially parallel to the axis of elongation of the tape, the fibers of the second plurality of fibers being disposed normal to the fibers of the first plurality of fibers, the first plurality of fibers being attached to the second plurality of fibers to form a scrim, the tensile strength of the second plurality of fibers being greater than the tensile strength of the first plurality of fibers, a plastic coating disposed on at least one surface of the scrim, said coating closing voids between the fibers and rendering the tape water impervious, and a sign disposed on the tape adapted to contain information related to the line.

13. An indicating means for use in a backfilled trench above an elongated line comprising the combination of claim 12 in combination with an electrically conducting metal foil mounted on one side of the tape.

14. An indicating means for use in a backfilled trench above an elongated line comprising the combination of claim 13 in combination with a thin plastic film mounted on the side of the foil opposite the tape, the assembly of tape, coating, foil and film forming a water tight elongated structure.

15. An indicating means for use in a backfilled trench above an elongated line comprising the combination of claim 12 wherein the first plurality of fibers are cross-woven with the second plurality of fibers.

16. An indicating means for use in a backfilled trench above an elongated line comprising the combination of claim 12 wherein the fibers of the first plurality of fibers and the fibers of the second plurality of fibers have approximately the same individual tensile strengths, and the second plurality of fibers has more fibers per unit of length measured normal to the fibers than the first plurality of fibers measured normal to the fibers thereof.

17. In a backfilled trench in the earth having an elongated line adjacent he bottom thereof and positioned intermediate said line and the surface of the earth, and generally overlying said line, a thin tape having an axis of elongation and a transverse axis normal to the axis of elongation, said tape having a first plurality and a second plurality of elongated plastic fibers, the fibers of the first plurality of fibers being disposed substantially parallel to the axis of elongation of the tape, the fibers of the second plurality of fibers being disposed normal to the fibers of the first plurality of fibers, the first plurality of fibers being attached to the second plurality of fibers to form a scrim, a plastic coating disposed on at least one surface of the scrim, said coating closing voids between the fibers and rendering the tape water impervious, and a sign disposed on the tape adapted to contain information related to the line.

18. In a backfilled trench according to claim 15 wherein an electrically conducting foil is mounted on one side of the scrim.

* * * * *